United States Patent
Wang et al.

(10) Patent No.: US 10,356,558 B2
(45) Date of Patent: Jul. 16, 2019

(54) OBSTACLE LOCATING METHOD AND APPARATUS

(71) Applicant: Beijing Xiaomi Mobile Software Co., Ltd., Haidian District, Beijing (CN)

(72) Inventors: Da Wang, Beijing (CN); Yueyue Chu, Beijing (CN); Yue Cheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/483,025

(22) Filed: Apr. 10, 2017

(65) Prior Publication Data

US 2017/0303089 A1  Oct. 19, 2017

(30) Foreign Application Priority Data

Apr. 14, 2016 (CN) .......................... 2016 1 0232637

(51) Int. Cl.
*H04W 24/00* (2009.01)
*H04W 4/02* (2018.01)
*G01C 21/20* (2006.01)
*G05D 1/00* (2006.01)

(52) U.S. Cl.
CPC .......... *H04W 4/025* (2013.01); *G01C 21/206* (2013.01); *G05D 1/0044* (2013.01); *G05D 2201/0203* (2013.01)

(58) Field of Classification Search
CPC .. H04W 4/02; H04W 64/00; H04L 29/08657; H04L 29/08108; H04L 29/08936; G01S 5/0252; G01S 5/02; G01S 5/14; H04M 1/72572; G01C 21/20
USPC ................ 455/414.2–415, 456.1–456.3, 457
See application file for complete search history.

(56) References Cited

U.S. PATENT DOCUMENTS

| 8,396,254 | B1 | 3/2013 | Hickman |
| 9,170,113 | B2 | 10/2015 | O'Neill et al. |
| 9,429,434 | B2 | 8/2016 | O'Neill et al. |
| 2003/0098789 | A1* | 5/2003 | Murakami ....... G08B 13/19634 340/506 |
| 2013/0178227 | A1* | 7/2013 | Vartanian ................ G01S 15/08 455/456.1 |
| 2013/0206177 | A1 | 8/2013 | Burlutskiy |
| 2013/0226451 | A1 | 8/2013 | O'Neill et al. |

(Continued)

FOREIGN PATENT DOCUMENTS

| CN | 101126808 A | 2/2008 |
| CN | 102495406 A | 6/2012 |

(Continued)

OTHER PUBLICATIONS

Extended European search report issued in corresponding European Patent Application No. 17165999.8, from the European Patent office, dated Sep. 13, 2017, 10 pages.

(Continued)

*Primary Examiner* — Dai Phuong
(74) *Attorney, Agent, or Firm* — Arch & Lake LLP

(57) ABSTRACT

This disclosure discloses an obstacle locating method and apparatus, which pertain to the field of locating technology. The obstacle locating method includes: acquiring a location of a locating device when an obstacle is found; adding the location and an identification of an indoor map corresponding to the location into location information; and sending the location information to a mobile device, where the location information triggers the mobile device to mark and display the location on an indoor map having the identification.

12 Claims, 9 Drawing Sheets

(56) References Cited

U.S. PATENT DOCUMENTS

| | | | |
|---|---|---|---|
| 2014/0316636 A1 | 10/2014 | Hong et al. | |
| 2014/0334669 A1* | 11/2014 | Acharya | G06F 3/017 |
| | | | 382/103 |
| 2015/0065081 A1* | 3/2015 | Estes | H04W 4/021 |
| | | | 455/404.2 |
| 2015/0160328 A1* | 6/2015 | Peinhardt | G01S 5/0036 |
| | | | 455/456.3 |
| 2016/0003626 A1 | 1/2016 | O'Neill et al. | |
| 2016/0148476 A1* | 5/2016 | Wakeyama | G08B 13/1966 |
| | | | 348/143 |
| 2016/0342858 A1 | 11/2016 | Tang et al. | |
| 2017/0013184 A1* | 1/2017 | Yamanishi | H04N 5/23206 |
| 2017/0223302 A1* | 8/2017 | Conlan | H04N 5/44504 |

FOREIGN PATENT DOCUMENTS

| | | |
|---|---|---|
| CN | 103685521 A | 3/2014 |
| CN | 103901895 A | 7/2014 |
| CN | 103926912 A | 7/2014 |
| CN | 104794603 A | 7/2015 |
| CN | 104850229 A | 8/2015 |
| CN | 104976999 A | 10/2015 |
| CN | 105049526 A | 11/2015 |
| CN | 105203093 A | 12/2015 |
| CN | 105204505 A | 12/2015 |
| CN | 105227911 A | 1/2016 |
| CN | 105259898 A | 1/2016 |

OTHER PUBLICATIONS

First Office Action (including English translation) issued in corresponding Chinese Application No. 201610232637.2 dated Sep. 25, 2017, 13 pages.

International Search Report issued in corresponding International Application No. PCT/CN2016/098263, dated Jan. 5, 2017, 12 pages.

* cited by examiner

OBSTACLE LOCATING METHOD AND APPARATUS

CROSS-REFERENCE TO RELATED APPLICATIONS

The application is based upon and claims priority to Chinese Patent Application No. 201610232637.2, filed on Apr. 14, 2016, the entire contents of which are incorporated herein by reference in their entirety.

TECHNICAL FIELD

The present disclosure relates to the field of locating technology, and more particularly to an obstacle locating method and apparatus.

BACKGROUND

In daily life, a person may often forget the location of an object he/she puts aside carelessly. When the person forgets the location of an object, he/she may tend to search for the object in a large scope. If the object rolls to a hidden corner due to some reason, the person may not be able to find the object at the corner. Therefore, the process of manually searching for the object is inefficient and is sometimes time consuming.

SUMMARY

The present disclosure provides an obstacle locating method and apparatus.

According to a first aspect of embodiments of the present disclosure, an obstacle locating method is provided. The method may be implemented in a locating device and may include: acquiring a location of a locating device when an obstacle is found; adding the location and an identification of an indoor map corresponding to the location into location information; and sending the location information to a mobile device, where the location information triggers the mobile device to mark and display the location on the indoor map having the identification.

According to a second aspect of the embodiments of the present disclosure, an obstacle locating method is provided. The method may be implemented in a mobile device and may include: receiving location information sent by a locating device, the location information being sent after the locating device acquires an indoor location thereof when finding an obstacle indoors and including the location and an identification of an indoor map corresponding to the indoor location; and marking and displaying the location contained in the location information on the indoor map having the identification.

According to a third aspect of the embodiments of the present disclosure, an obstacle locating apparatus is provided. The apparatus may be implemented in a locating device and may include: a processor; and a memory for storing instructions executable by the processor. The processor is configured to: acquire a location of the locating device when an obstacle is found; add the location and an identification of an indoor map corresponding to the location into location information; and send the location information to a mobile device, where the location information triggers the mobile device to mark and display the location on the indoor map having the identification.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of the specification, illustrate embodiments according to the present disclosure and serve to explain the principles of the present disclosure together with the description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Exemplary embodiments will be described in detail herein, examples of which are illustrated in the accompanying drawings. The following description refers to the accompanying drawings in which the same numbers in different figures represent the same or similar elements unless otherwise indicated. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
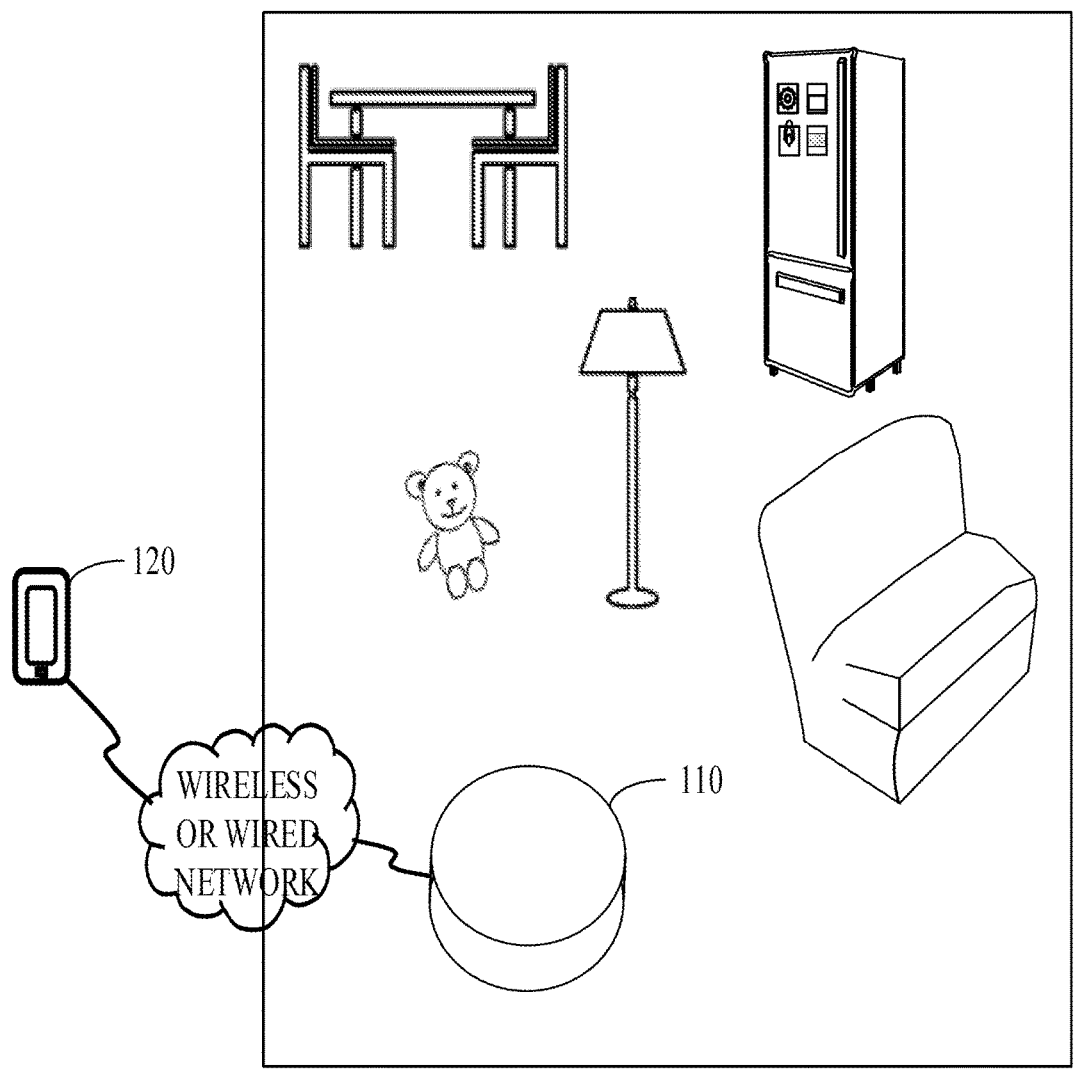
FIG. 1 is a schematic diagram of an environment for implementing an obstacle locating method according to some exemplary embodiments.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner FIG. 1 is a schematic diagram of an environment for implementing an obstacle locating method according to some exemplary embodiments. As shown in FIG. 1, the implementing environment may include at least one locating device 110 and a mobile device 120.

The locating device 110 may be a smart device movable and with a sensing ability, such as a smart robot, a smartphone, a tablet computer and so on. The locating device may be used for locating a smart device and recording an indoor map. The indoor map may be used for indicating relative locations of various fixed objects in an indoor space. For example, as shown in FIG. 1, the indoor map records that a dinner table is placed at the northwest corner of a room and that the table is 1.5 meter long, 0.6 meter wide, 1 meter high, 1 meter from the west wall, and 0 meter from the north wall.

The locating device 110 and the mobile device 120 may be connected to each other in a wireless or wired networking manner and perhaps through a router. The wireless networking manner referred to herein may be a mobile data network, and the wireless networking scheme may be wireless fidelity (WiFi) or Bluetooth.

The locating device 110 may provide location information to the mobile device 120.

The mobile device 120 may receive the location information provided by the locating device 110 and may send notifications to the locating device 110.

Figure 2:
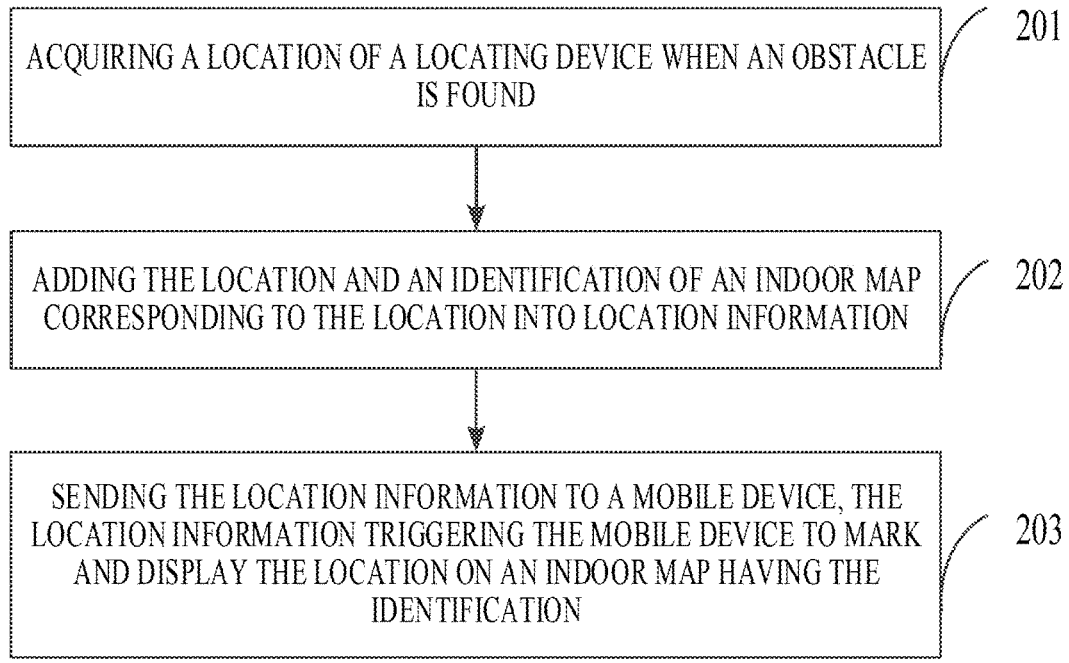
FIG. 2 is a flowchart of an obstacle locating method according to an exemplary embodiment.

FIG. 2 is a flowchart of an obstacle locating method implemented in the locating device 110 shown in FIG. 1 according to an exemplary embodiment. As shown in FIG. 2, the obstacle locating method may include the following steps.

In step 201, a location of the locating device is acquired when an obstacle is found.

In step 202, the location and an identification of an indoor map corresponding to the location are added into location information.

In step 203, the location information is sent to a mobile device, the location information triggering the mobile device to mark and display the location on an indoor map having the identification.

In summary, by acquiring an indoor location of a locating device when the locating device finds an obstacle, adding the location and an identification of an indoor map corresponding to the indoor location into location information and sending the location information to a mobile device, and because the location is marked and displayed on the indoor map with this identification after the mobile device receives the location information, the obstacle locating method provided in the embodiment of the present disclosure solves the problem that it is inefficient and time-consuming to manually search for an object after a person forgets the location of the object and achieves the effect that a locating device automatically locates the indoor location thereof when finding an obstacle and sends the location information to a mobile terminal to alert the person that there is an obstacle around this indoor location.

Figure 3:
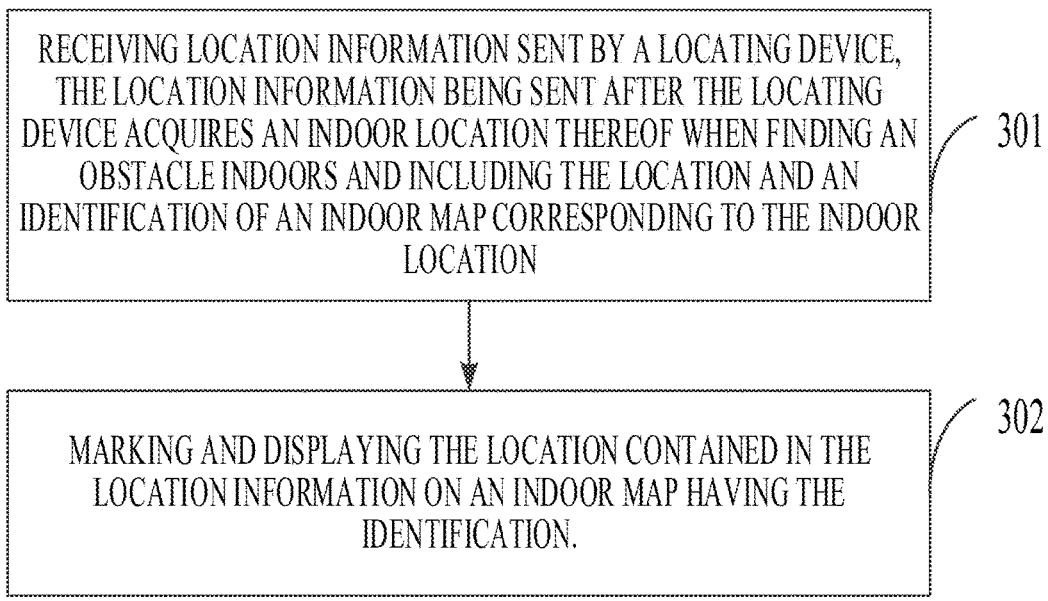
FIG. 3 is a flowchart of an obstacle locating method according to another exemplary embodiment.

FIG. 3 is a flowchart of an obstacle locating method implemented in the mobile device 120 shown in FIG. 1 according to another exemplary embodiment. As shown in FIG. 3, the obstacle locating method may include the following steps.

In step 301, location information sent by a locating device is received, the location information being sent after the locating device acquires an indoor location thereof when finding an obstacle indoors and including the location and an identification of an indoor map corresponding to the indoor location.

In step 302, the location contained in the location information is marked and displayed on an indoor map having the identification.

In summary, by receiving location information sent by a locating device and marking and displaying the location contained in the location information on an indoor map having the identification, and because the location information of the locating device is sent to a mobile device after the locating device finds an obstacle, the obstacle locating method provided in the embodiment of the present disclosure solves the problem that it is inefficient and time-consuming to manually search for an object after a person forgets the location of the object and achieves the effect that a locating device automatically locates the indoor location thereof when finding an obstacle and sends the location information to a mobile terminal to alert the person that there is an obstacle around this indoor location.

In practical application, a person may often forget the location of an object which he/she put aside carelessly. When he/she may need to find this object, he/she may search for the object in a large scope. If the object rolls to a hidden corner due to some reason, the person may not find the object and because the person may ignore to search for the object at the corner. In this embodiment, in order to avoid the inefficient and time-consuming process of manually finding an object, a locating device automatically locates an indoor location thereof when finding an obstacle and sends the location information to a mobile terminal to alert the person that there is an obstacle around this indoor location. Hereinafter, the obstacle locating method will be described in conjunction with FIGS. 4A, 4B and 5.

Figure 4A:
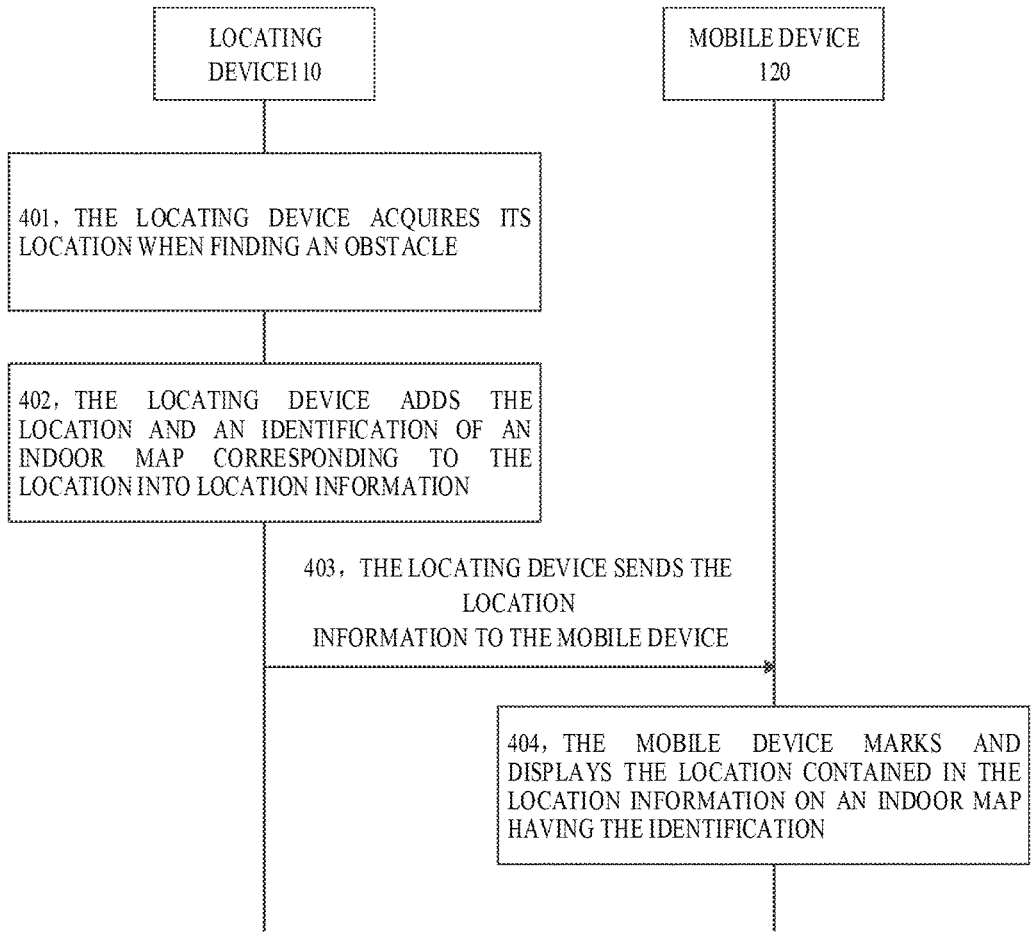
FIG. 4A is a flowchart of an obstacle locating method according to still another exemplary embodiment.

FIG. 4A is a flowchart of an obstacle locating method according to another exemplary embodiment. As shown in FIG. 4A, the obstacle locating method may include the following steps.

In step 401, a locating device acquires its location when finding an obstacle.

The obstacle may be an obstacle object inside an indoor space that a person may place there. The location acquired by the locating device in Step 401 may refer to the location of the obstacle object or the location of the locating device. The location of the obstacle object or the location of the locating device may refer to an absolute indoor location of the obstacle or the location of the locating device.

Optionally, the locating device is provided with a 3-dimension (3D) depth camera with a photographing function and an aurora radar detector with a detection and perception function and/or other equipment with similar functions.

Figure 4B:
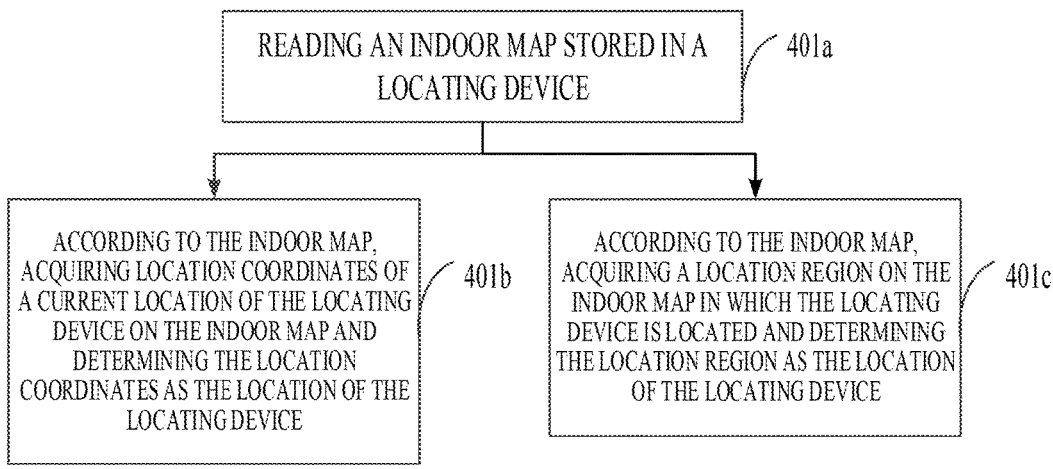
FIG. 4B is a flowchart of a method for acquiring a location of a locating device according to an exemplary embodiment.

FIG. 4B is a flowchart of a method for acquiring a location of a locating device according to an exemplary embodiment. As shown in FIG. 4B, the method for acquiring the location of the locating device may be implemented through the following steps 401a to 401b.

In step 401a, an indoor map stored in the locating device is read.

The indoor map referred to herein may be used for reflecting relative locations of various fixed objects in an indoor space.

The locating device may use a plurality of sensors or infrared scanning perception robots to detect the surrounding environment and detect the distance from an obstacle, and determine locations of various objects in the indoor space and relative locations of the various objects to obtain an indoor map.

In addition, the locating device may detect and perceive the shape of the obstacle through infrared scanning or sensor detection. The locating device may determine whether the obstacle is a sofa, a table or another object according to the shape of the obstacle. If the locating device scans an obstacle, a user of the locating device may set the information and name of the obstacle and so on.

In step 401b, location coordinates of a current location of the locating device on the indoor map may be acquired according to the indoor map, and the location coordinates may be determined as the location of the locating device.

The locating device may learn a surrounding obstacle in real time and may compare the same with obstacles on the indoor map to learn its current location.

Figure 4C:
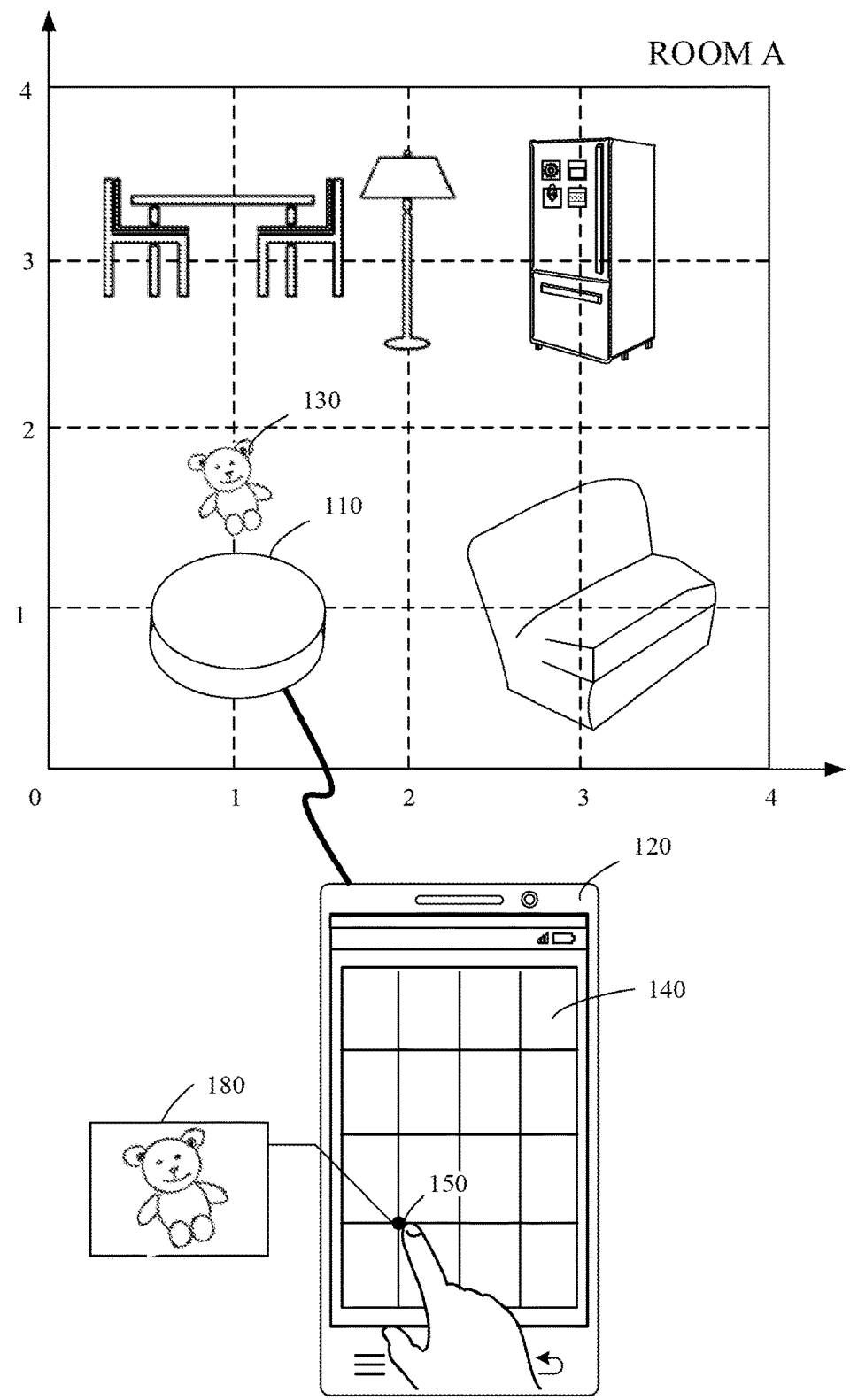
FIG. 4C is a schematic diagram of acquiring location coordinates of a current location of a locating device on an indoor map according to an exemplary embodiment.

FIG. 4C is a schematic diagram of acquiring location coordinates of a current location of a locating device on an indoor map according to an exemplary embodiment. For example, the room where the locating device is located has an area of 4*4 square meters, when finding a doll 130 the locating device 110 may acquire its location as (1, 1).

In step 401c, a location region on the indoor map in which the locating device is located may be acquired according to the indoor map, and the location region may be determined as the location of the locating device.

Figure 4D:
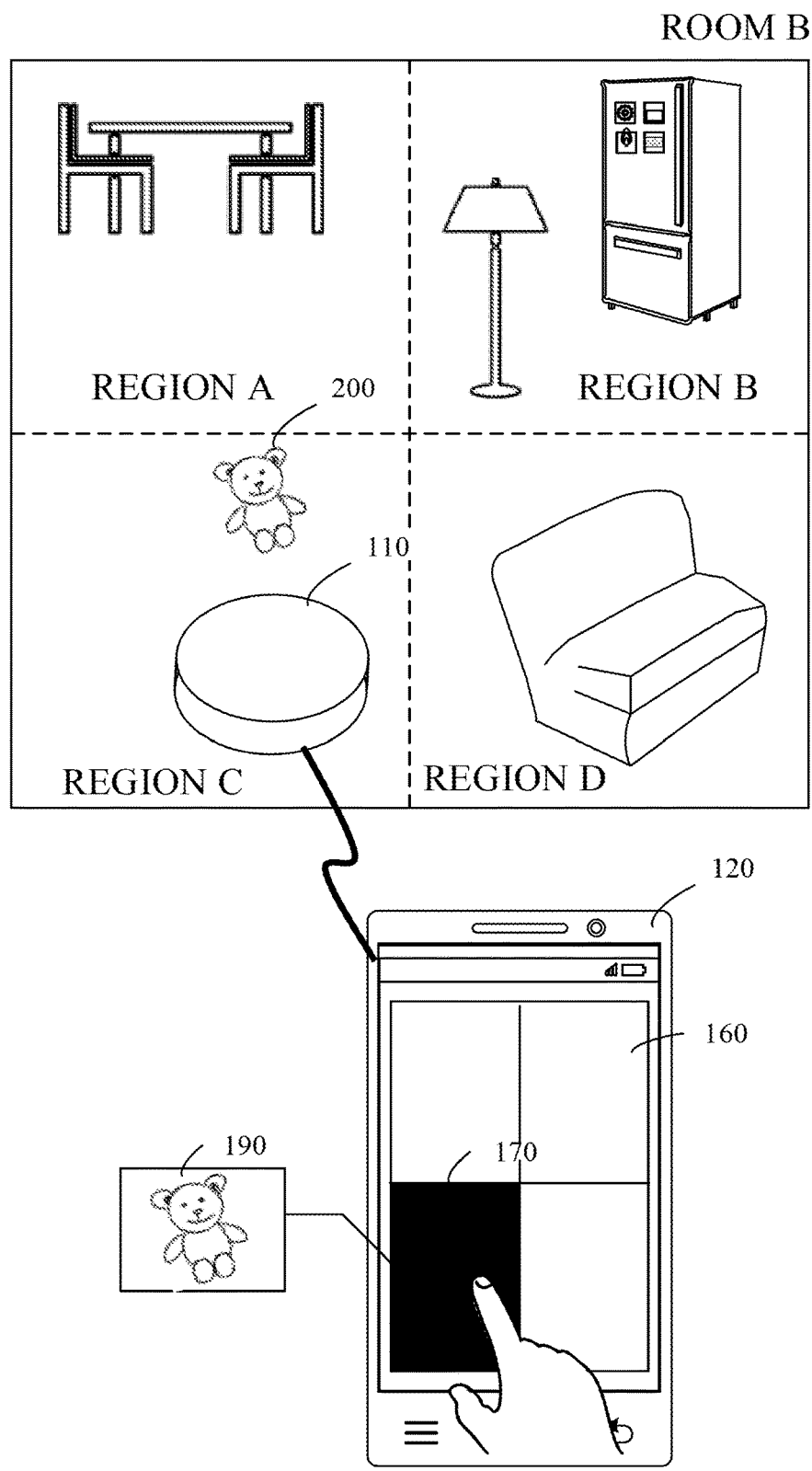
FIG. 4D is a schematic diagram of acquiring a location region of a locating device on an indoor map according to another exemplary embodiment.

FIG. 4D is a schematic diagram of acquiring a location region on an indoor map in which the locating device is located according to another exemplary embodiment. For example, the room area where the locating device is located is divided into 4 regions, when finding a doll 200 the locating device 110 may acquire its location as 'region C'.

In step 402, the locating device adds the location and an identification of an indoor map corresponding to the location into location information.

The locating device may store a plurality of indoor maps, each indoor map uniquely corresponding to an identification of one indoor map.

Optionally, if a location recorded by the locating device is not within a preset range from a fixed object, the locating device may add the location and an identification of an indoor map corresponding to the location into the location information.

If the location recorded by the locating device is within a preset range from a fixed object, the location acquired by the locating device may be the location where the locating device finds the fixed object, because the fixed object referred to herein is an object which cannot be moved indoors or which is moved at a frequency less than a preset threshold value. For example, the fixed object may be a sofa, a table, a refrigerator and other similar objects.

In order to prevent the locating device from frequently sending the location of the fixed object to the mobile device, if the location recorded by the locating device is not within a preset range from a fixed object, the locating device may add the location and an identification of an indoor map corresponding to the location into location information.

The preset range may be fixed to a certain degree and the range may depend on the fixed object. For example, the range may be half a meter from the fixed object. When the locating device is within the preset range from the fixed object, the "fixed object" may be considered as an unnormal obstacle and mark the location on the map. However, because the fixed object is always there, and there may not be needed to mark them every time. As such, only an unnormal obstacle on the ground may be marked on the map.

Optionally, when finding an obstacle indoors, the locating device photographs the obstacle to obtain a picture of the obstacle and adds the picture of the obstacle into the location information.

When finding an obstacle indoors, the locating device photographs the obstacle with a camera and adds the picture of the obstacle, the location and the identification of the indoor map into the location information.

In step 403, the locating device sends the location information to a mobile device.

Taking the location information being represented by coordinates as an example and referring still to FIG. 4C, when finding a doll 130 in a room A, the locating device 110 sends location information "(1, 1), room A" to a mobile device 120.

Taking the location information being represented by a region as an example and referring still to FIG. 4D, when finding a doll 200 in a room A, the locating device 110 sends location information "region C, room B" to the mobile device 120.

Accordingly, the mobile device receives the location information sent by the locating device.

In step 404, the location contained in the location information is marked and displayed by the mobile device on an indoor map having the identification.

Optionally, a trigger signal is received at the location marked and displayed on the indoor map and the picture of the obstacle is displayed at the location.

Taking the location being represented by coordinates as an example and referring still to FIG. 4C, after receiving the location information sent by the locating device 110, the mobile device 120 marks and displays a location 150 of the doll 130 contained in the location information on an indoor map 140 having the identification. If the locating device 110 adds the picture of the doll 130 into the location information and then sends the location information to the mobile device 120, the mobile device 120 may display the picture 180 of the obstacle corresponding to the location 150 when detecting that a user touches the location 150.

Taking the location being represented by a region as an example and referring still to FIG. 4D, after receiving the location information sent by the locating device 110, the mobile device 120 marks and displays a location 170 of the doll 200 contained in the location information on an indoor map 160 having the identification. If the locating device 110 adds the picture of the doll 200 into the location information and then sends the location information to the mobile device 120, the mobile device 120 may display the picture 190 of the obstacle corresponding to the location 170 when detecting that a user touches the location 170.

In summary, by acquiring an indoor location of a locating device when the locating device finds an obstacle, adding the location and an identification of an indoor map corresponding to the indoor location into location information and sending the location information to a mobile device, and because the location is marked and displayed on the indoor map with this identification after the mobile device receives the location information, the obstacle locating method provided in the embodiment of the present disclosure solves the problem that it is inefficient and time-consuming to manually search for an object after a person forgets the location of the object and achieves the effect that a locating device automatically locates the indoor location thereof when finding an obstacle and sends the location information to a mobile terminal to alert the person that there is an obstacle around this indoor location.

In this embodiment, by acquiring the current location of the locating device on the indoor map and determining the current location as the indoor location of the locating device, the location acquired by the locating device is more accurate.

In this embodiment, by adding the picture of the obstacle into the location information, the user of the locating device can clearly know the appearance of the obstacle corresponding to the location information by displaying the picture of the obstacle in the location information after the mobile device receives the location information fed back by the locating device.

Sometimes, the locating device may detect and record the location information for the obstacle such as coordinates of the obstacle inside an indoor space and send the location information of the obstacle to the mobile device. For example, as shown in FIG. 4C, the locating device 110 may detect coordinates of doll 130 are (1, 1.5). As such, the locating device 110 may record the coordinates of doll 130 and send the coordinates to the mobile device 120. In this scenario, the location of the locating device may not be used to represent the location of the fixed object the locating device detects even though the fixed object is close to the locating device.

Figure 5:
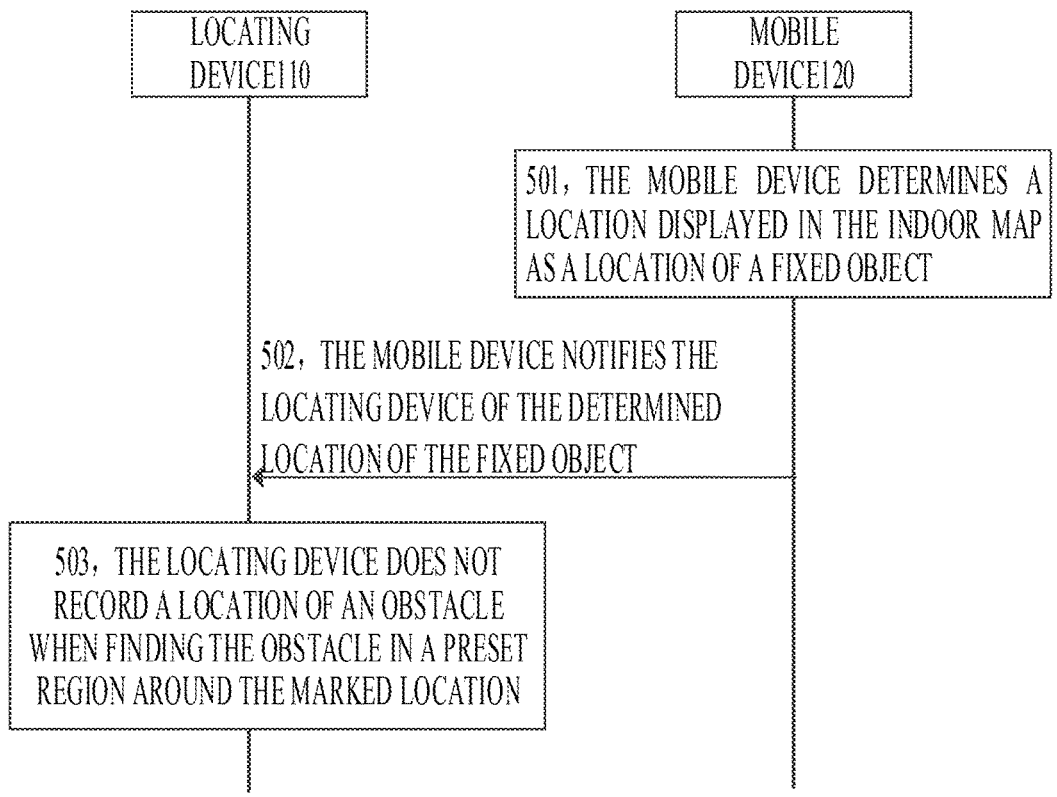
FIG. 5 is a flowchart of a method for marking a location of an obstacle according to an exemplary embodiment.

In a possible implementation, the user of the mobile device may mark a location of an obstacle which is unnecessary to detect in the mobile device, and the mobile device notifies the locating device not to record the marked location of the obstacle. FIG. 5 is a flowchart of a method for marking a location of an obstacle according to an exemplary embodiment. As shown in FIG. 5, the method for marking the location of the obstacle may be implemented through the following steps 501 to 503.

In step 501, a mobile device determines a location displayed on an indoor map as a location of a fixed object.

Taking the location being represented by coordinates as an example, after receiving the location, (1, 1) for example, marked and displayed by the user on the indoor map, the mobile terminal determines the location, (1, 1) for example, as the location of the fixed object.

Taking the location being represented by a region as an example, after receiving the location 'region C' marked and displayed by the user on the indoor map, the mobile terminal determines the location 'region C' as the location of the fixed object.

It should be noted that the manner for the user to mark the location may be a user operation on the mobile device such as a long-press operation, a double-click operation, a preset gesture and/or other similar type of operations.

In step 502, the mobile device notifies the locating device of the determined location of the fixed object.

Taking the location being represented by coordinates as an example, after the mobile device determines the location (1, 1) as the location of the fixed object, the marked location (1, 1) may be sent to the locating device.

Accordingly, the locating device receives the marked location sent by the mobile device.

In step 503, the locating device does not record the location of an obstacle when finding the obstacle in a preset region around the marked location.

Taking the location being represented by coordinates as an example, after receiving the marked location (1, 1) sent by the mobile device, the locating device does not record the location of an obstacle when finding the obstacle in a preset region around the location (1, 1).

In this embodiment, since the marked location is a location of an obstacle set by the user of the mobile device as unnecessary to detect, when finding an obstacle within a preset region around the marked location, the locating device may not record the location of the obstacle, thereby preventing the location of an obstacle which is unnecessary to detect from being sent to the mobile device.

Sometimes, the locating device may still detect and record the location of the obstacle even though the user of the mobile device marks the location for the obstacle. For example, the locating device may detect and record the location of the obstacle and send the location information to the mobile device and the mobile device may match the detected and recorded location of the obstacle with the marked location and determine whether the marked location is accurate. The mobile device may generate an alert when a mismatch is discovered between the marked location and the detected location. Such a mismatch detection is useful because the obstacle may move from one location to another from time to time and the marked location may not be accurate.

Sometimes, it is possible to have more than one obstacles in the marked location. The locating devices may detect and record more than one locations for obstacles that are close to each other and send the detected and recorded locations for the obstacles to the mobile device. When the mobile devices receive the detected and recorded locations for more than one obstacles in proximity, and the mobile device discovers that the user may only mark the location for one obstacle, the mobile device may determine which one location of received detected and recorded locations is for the marked location and update the indoor map accordingly. Alternatively, the mobile device may generate an alert to ask the user to select the marked location for one of multiple obstacles in proximity.

The indoor map may be generated inside a room or may be generated inside a moving space such as a car or a boat. The locating device may be a fixed device for detecting and recording locations of obstacles inside the room or the moving space. For example the location device may be a sensor inside the car or inside a room. The locating device may also be a moving device. For example, the locating device may be a moving robot inside a room of the house. The locating device may also be a device that is fixed on a moving device. For example, the locating device may be fixed to a cleaning robot and the locating device may detect and record locations of obstacles when the cleaning robot cleans the floor of the room.

The following is apparatus embodiments of the present disclosure which can be used to execute the method embodiments of the present disclosure. As to details not disclosed in the apparatus embodiments of the present disclosure, reference can be made to the method embodiments of the present disclosure.

Figure 6A:
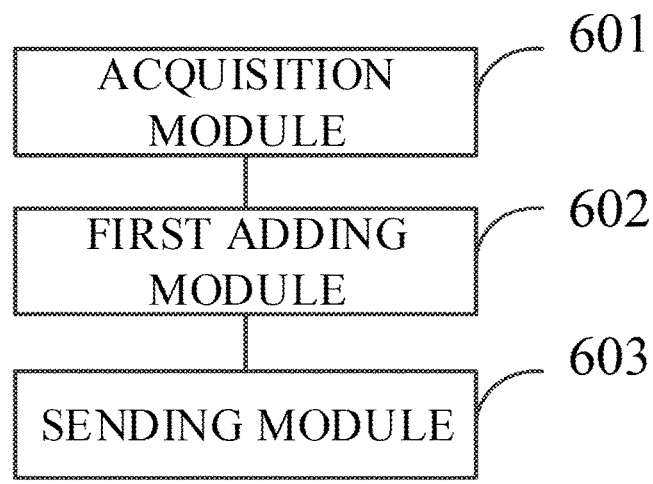
FIG. 6A is a block diagram of an obstacle locating apparatus according to an exemplary embodiment.

FIG. 6 is a block diagram of an obstacle locating apparatus according to an exemplary embodiment. As shown in FIG. 6A, the obstacle locating apparatus may be implemented in the locating device 110 and may include, but is not limited to, an acquisition module 601, a first adding module 602 and a second adding module 603.

The acquisition module 601 may be configured to acquire a location of the locating device when an obstacle is found indoors.

The location of the locating device may refer to an absolute indoor location of the locating device.

Optionally, the locating device may be provided with a 3D (3-dimension) depth camera with a photographing function and an aurora radar detector with a detection and perception function and/or other equipment with similar functions.

The first adding module 602 may be configured to add the location acquired by the acquisition module 601 and an identification of an indoor map corresponding to the location into location information.

The locating device may store a plurality of indoor maps, and each indoor map may uniquely correspond to an identification of one indoor map. If a location recorded by the locating device is not within a preset range from a fixed object, the locating device may add the location and an identification of an indoor map corresponding to the location into the location information.

The fixed object referred to herein may be an object which cannot be moved indoors or which is moved at a frequency less than a preset threshold value. For example, the fixed object may be a sofa, a table, a refrigerator and so on.

Optionally, when finding an obstacle indoors, the locating device may photograph the obstacle to obtain a picture of the obstacle and may add the picture of the obstacle into the location information.

When finding an obstacle indoors, the locating device may photograph the obstacle with a camera and may add the picture of the obstacle, the location and the identification of the indoor map into the location information.

The sending module 603 may be configured to send the location information to a mobile device, the location information triggering the mobile device to mark and display the location in an indoor map having the identification.

Figure 6B:
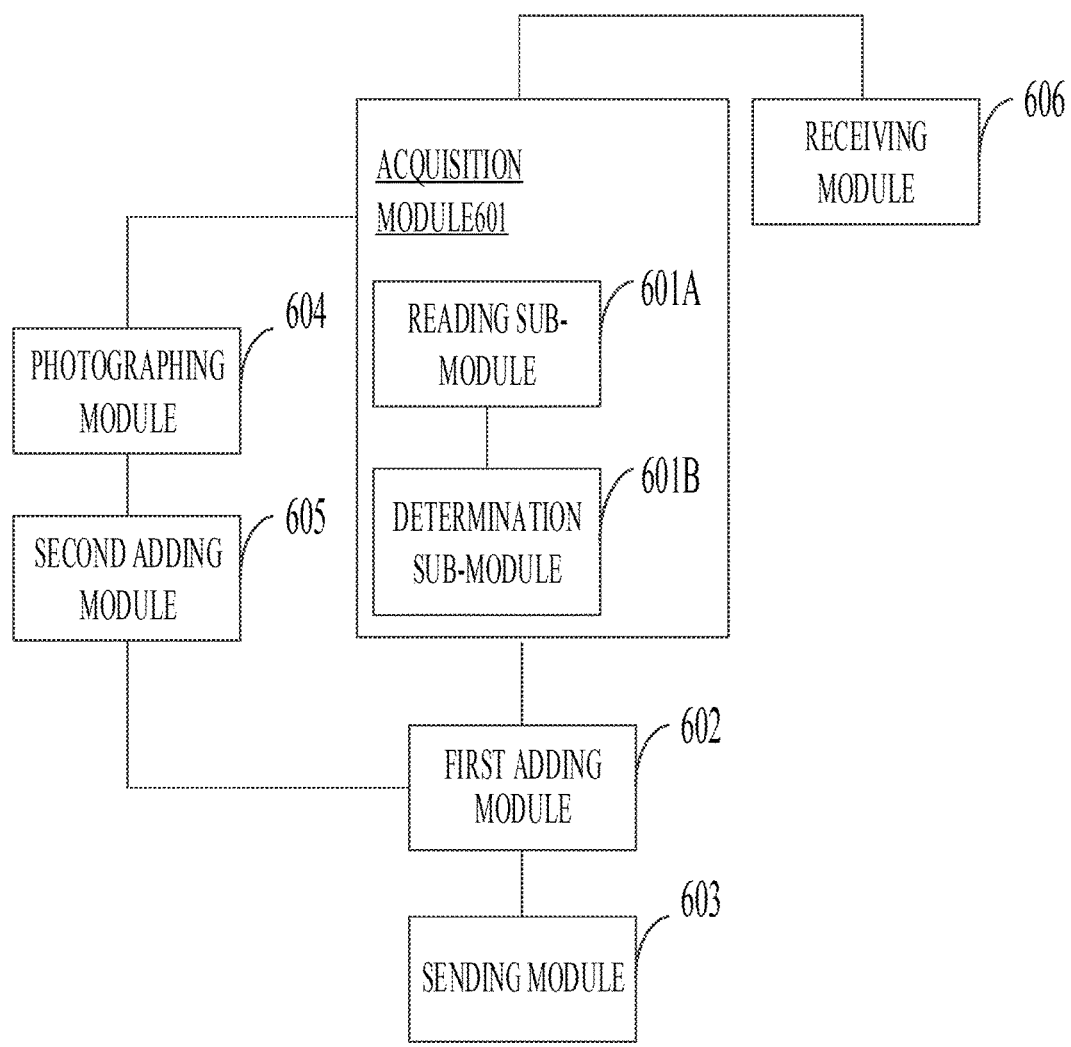
FIG. 6B is a block diagram of an obstacle locating apparatus according to another exemplary embodiment.

In a possible implementation, referring to FIG. 6B which is a block diagram of an obstacle locating apparatus according to another exemplary embodiment, the acquisition module 601 may include a reading sub-module 601a and a determination sub-module 601b.

The reading sub-module 601a may be configured to read an indoor map stored in the locating device, the indoor map reflecting relative locations of various fixed objects in an indoor space.

The indoor map referred to herein may be used for reflecting relative locations of various fixed objects in an indoor space.

The locating device may use a plurality of sensors or infrared scanning perception robots to detect the surrounding environment and detect the distance from an obstacle, and determine locations of various objects in the indoor space and relative locations of the various objects to obtain an indoor map.

In addition, the locating device may detect and perceive the shape of the obstacle through infrared scanning or sensor detection. That is, the locating device may determine whether the obstacle is a sofa, a table or another object according to the shape of the obstacle. If the locating device scans an obstacle, a user may set the information and name of the obstacle and so on.

The determination sub-module 601b may be configured to: according to the indoor map read by the reading sub-module 601a, acquire location coordinates of a current location of the locating device on the indoor map and determine the location coordinates as the location of the locating device; or according to the indoor map read by the reading sub-module 601a, acquire a location region of the indoor map in which the locating device is located and determine the location region as the location of the locating device.

The locating device may learn a surrounding obstacle in real time and may compare the same to obstacles on the indoor map to learn its current location.

The location referred to herein may be represented with coordinates and may also be represented with a region identification. Other representations may also be developed to reflect the location.

In a possible implementation, referring still to FIG. 6B, the apparatus may further include: a photographing module 604 and a second adding module 605.

The photographing module 604 may be configured to photograph the obstacle to obtain a picture of the obstacle.

The second adding module 605 may be configured to add the picture of the obstacle photographed by the photographing module 604 into the location information, where after the location information is sent to the mobile device, the picture in the location information triggers the mobile device to display the picture of the obstacle at the marked and displayed location on the displayed indoor map having the identification carried in the location information.

In a possible implementation, referring to FIG. 6B, the first adding module 602 may be configured to: if a recorded location is not within a preset range from a fixed object, add the location and the identification of the indoor map into the location information, the fixed object being an object which cannot be moved indoors or which is moved at a frequency less than a preset frequency.

If the location recorded by the locating device is within a preset range from a fixed object, the location acquired by the locating device may be the location where the locating device finds the fixed object, because the fixed object referred to herein is an object which cannot be moved indoors or which is moved at a frequency less than a preset threshold value. For example, the fixed object may be a sofa, a table, a refrigerator and so on.

In order to prevent the locating device from frequently sending the location of the fixed object to the mobile device, if the location recorded by the locating device is not within a preset range from a fixed object, the locating device may add the location and an identification of an indoor map corresponding to the location into location information.

In a possible implementation, referring still to FIG. 6B, the apparatus may further include: a receiving module 606.

The receiving module 606 may be configured to receive a marked location sent by the mobile device, and the locating device does not record a location of an obstacle when finding the obstacle in a preset region around the marked location.

In summary, by acquiring an indoor location of a locating device when the locating device finds an obstacle, adding the location and an identification of an indoor map corresponding to the indoor location into location information and sending the location information to a mobile device, and because the location is marked and displayed on the indoor map with this identification after the mobile device receives the location information, the obstacle locating apparatus provided in the embodiment of the present disclosure solves the problem that it is inefficient and time-consuming to manually search for an object after a user of the mobile device forgets the location of the object and achieves the effect that a locating device automatically locates the indoor location thereof when finding an obstacle and sends the location information to a mobile terminal to alert the user that there is an obstacle around this indoor location.

In this embodiment, by acquiring the current location of the locating device on the indoor map and determining the current location as the indoor location of the locating device, the location acquired by the locating device is more accurate.

In this embodiment, by adding the picture of the obstacle into the location information, the user can clearly know the appearance of the obstacle corresponding to the location information by displaying the picture of the obstacle in the location information after the mobile device receives the location information fed back by the locating device.

In this embodiment, since the marked location is a location of an obstacle set by the user as unnecessary to detect an obstacle, when finding an obstacle within a preset region around the marked location, the locating device does not record the location of the obstacle, thereby preventing the location of an obstacle which is unnecessary to detect from being sent to the mobile device.

Figure 7A:
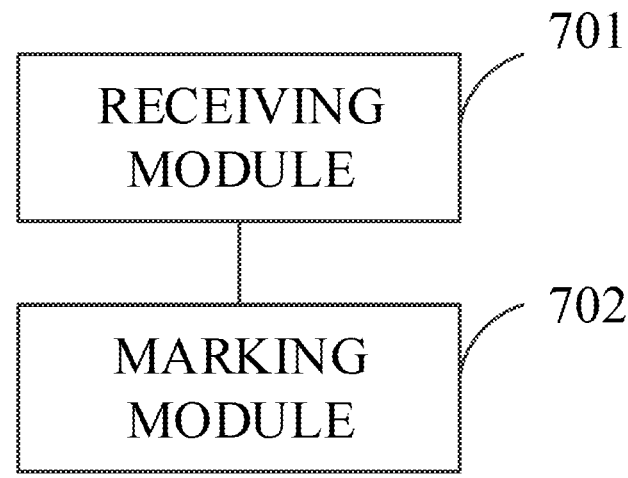
FIG. 7A is a block diagram of an obstacle locating apparatus according to still another exemplary embodiment.

FIG. 7 is a block diagram of an obstacle locating apparatus according to still another exemplary embodiment. As shown in FIG. 7A, the obstacle locating apparatus may be implemented in the mobile device 120 and may include, but is not limited to, a receiving module 701 and a marking module 702.

The receiving module 701 may be configured to receive location information sent by a locating device, the location information being sent after the locating device acquires an indoor location thereof when finding an obstacle indoors and including the location and an identification of an indoor map corresponding to the indoor location.

The marking module 702 may be configured to mark and display the location contained in the location information received by the receiving module 701 on an indoor map having the identification.

Figure 7B:
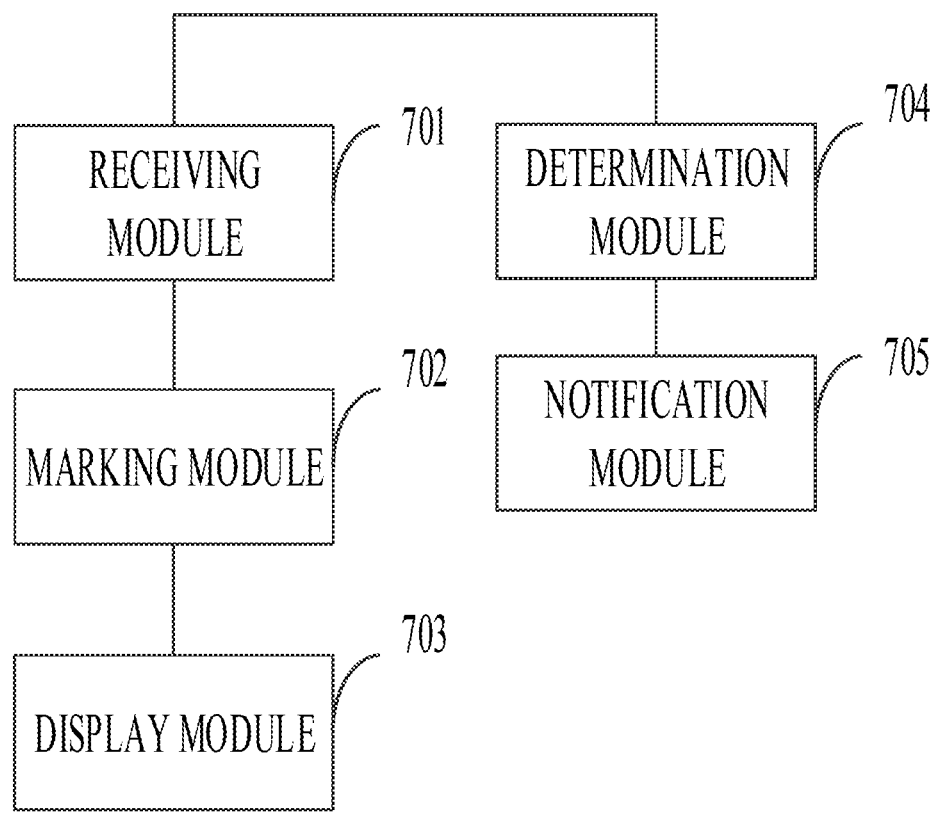
FIG. 7B is a block diagram of an obstacle locating apparatus according to another exemplary embodiment.

In a possible implementation, referring to FIG. 7B which is a block diagram of an obstacle locating apparatus according to another exemplary embodiment, the location information may further carry the picture corresponding to the obstacle, and the apparatus may further include a display module 703.

The display module 703 may be configured to receive a trigger signal at the location marked and displayed on the indoor map and display the picture of the obstacle at the location.

In a possible implementation, referring to FIG. 7B, the apparatus further includes: a determination module 704 and a notification module 705.

The determination module 704 may be configured to determine a location displayed on the indoor map as a location of a fixed object, the fixed object being an object which cannot be moved indoors or which is moved at a frequency less than a preset frequency.

The notification module 705 may be configured to notify the locating device of the determined location of the fixed object.

In summary, by receiving location information sent by a locating device and marking and displaying the location contained in the location information on an indoor map having the identification, and because the location information of the locating device is sent to a mobile device after the locating device finds an obstacle, the obstacle location apparatus provided in the embodiment of the disclosure solves the problem that it is inefficient and time-consuming to manually search for an object after a user of the mobile terminal forgets the location of the object and achieves the effect that a locating device automatically locates the indoor location thereof when finding an obstacle and sends the location information to a mobile terminal to alert the user that there is an obstacle around this indoor location.

In this embodiment, the user can know the appearance of the obstacle corresponding to the location information by displaying the picture of the obstacle in the location information.

In this embodiment, by marking a location of an obstacle which is unnecessary to detect and notifying the locating device not to record the location of an obstacle when finding the obstacle within a preset region around the marked location, thereby preventing the locating device from sending the location of an obstacle which is unnecessary to detect to the mobile device.

An obstacle locating system is provided according to an exemplary embodiment of the present disclosure. The system may include: at least one locating device and a mobile device.

The locating device may include an obstacle locating apparatus according to any of various possible implementations shown in FIGS. 6A and 6B, for which reference can be made to the description of FIGS. 6A and 6B and which will not be described here redundantly.

The mobile device may include an obstacle locating apparatus according to any of various possible implementations shown in FIGS. 7A and 7B, for which reference can be made to the description of FIGS. 7A and 7B and which will not be described here redundantly.

In summary, by acquiring an indoor location of a locating device when the locating device finds an obstacle, adding the location and an identification of an indoor map corresponding to the indoor location into location information and sending the location information to a mobile device, and because the location is marked and displayed on the indoor map with this identification after the mobile device receives the location information, the obstacle locating apparatus provided in the embodiment of the present disclosure solves the problem that it is inefficient and time-consuming to manually search for an object after a user of a mobile terminal forgets the location of the object and achieves the effect that a locating device automatically locates the indoor location thereof when finding an obstacle and sends the location information to the mobile terminal to alert the user that there is an obstacle around this indoor location.

An obstacle locating apparatus is provided according to an exemplary of the present disclosure. The apparatus can implement the obstacle locating method provided by the present disclosure as executed by a locating device. The obstacle locating apparatus may include: a processor and a memory for storing processor-executable instructions.

The processor may be configured to: acquire a location of a locating device when an obstacle is found; add the location and an identification of an indoor map corresponding to the location into location information; and send the location information to a mobile device, the location information triggering the mobile device to mark and display the location on an indoor map having the identification.

An obstacle locating apparatus is provided according to another exemplary of the present disclosure. The apparatus can implement the obstacle locating method provided by the present disclosure as executed by a mobile device. The obstacle locating apparatus may include: a processor and a memory for storing processor-executable instructions.

The processor may be configured to: receive location information sent by a locating device, the location information being sent after the locating device acquires an indoor location thereof when finding an obstacle indoors and including the location and an identification of an indoor map corresponding to the indoor location; and mark and display the location contained in the location information on an indoor map having the identification.

According to one aspect of the embodiments of the present disclosure, there is provided an obstacle locating apparatus. The apparatus may be implemented in a locating device and may include: an acquisition module configured to acquire a location of the locating device when an obstacle is found; a first adding module configured to add the location and an identification of an indoor map corresponding to the location into location information; and a sending module configured to send the location information to a mobile device, the location information triggering the mobile device to mark and display the location on an indoor map having the identification.

According to another aspect of the embodiments of the present disclosure, there is provided an obstacle locating apparatus. The apparatus may be implemented in a mobile device and may include: a receiving module configured to receive location information sent by a locating device, the location information being sent after the locating device acquires an indoor location thereof when finding an obstacle indoors and including the location and an identification of an indoor map corresponding to the indoor location; and a marking module configured to mark and display the location contained in the location information on an indoor map having the identification.

According to an additional aspect of the embodiments of the present disclosure, an obstacle locating system is provided. The system may include: at least one locating device and a mobile device. The locating device may include an obstacle locating apparatus according to any of the third aspect and various optional implementations of the third aspect; and the mobile device may include an obstacle locating apparatus according to any of the fourth aspect and various optional implementations of the fourth aspect.

According to one additional aspect of the embodiments of the present disclosure, an obstacle locating apparatus is provided. The apparatus may be implemented in a mobile device and may include: a processor; and a memory for storing instructions executable by the processor. The processor is configured to: receive location information sent by a locating device, the location information being sent after the locating device acquires an indoor location thereof when finding an obstacle indoors and including the location and an identification of an indoor map corresponding to the indoor location; and mark and display the location contained in the location information on an indoor map having the identification.

Figure 8:
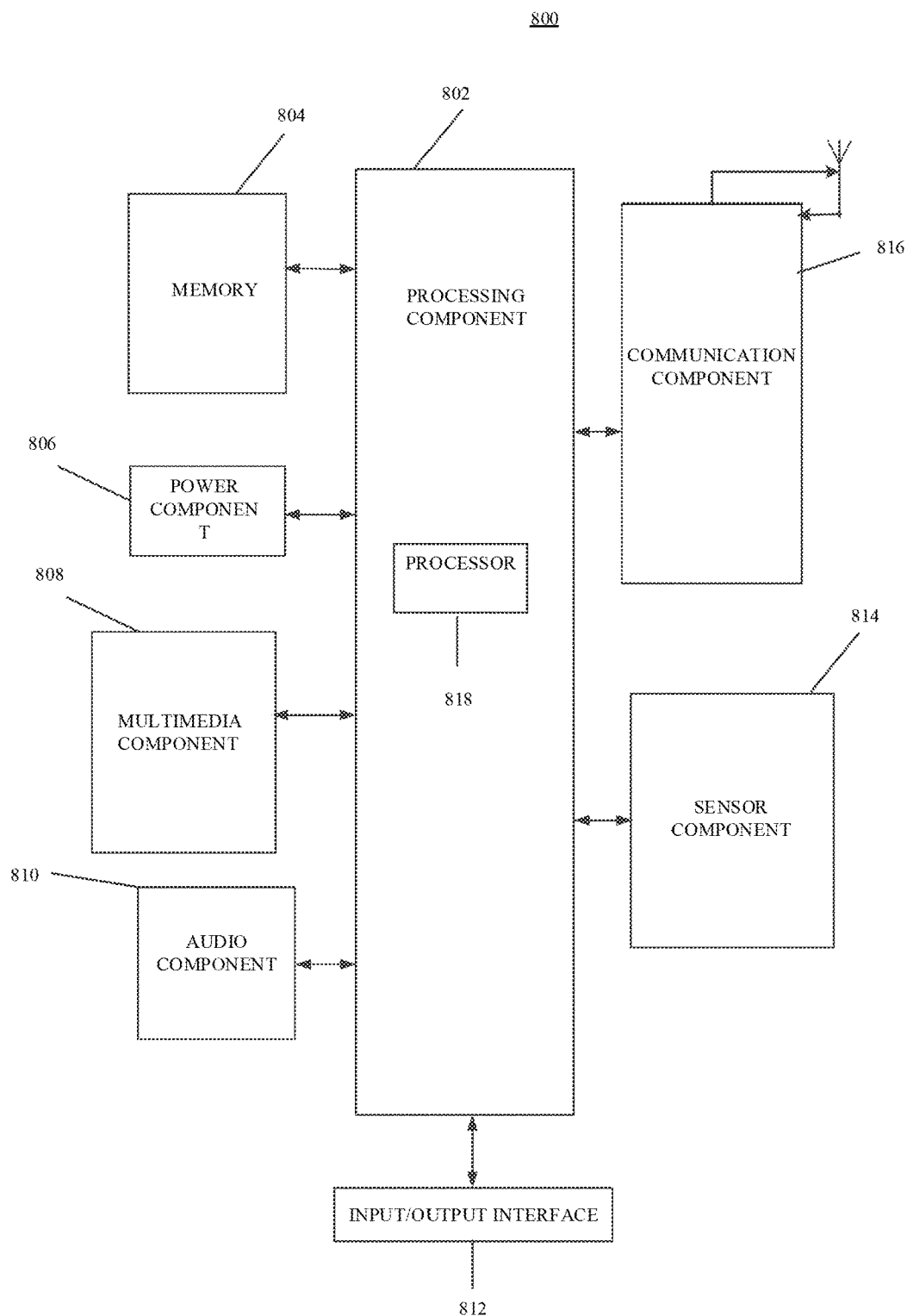
FIG. 8 is a block diagram of an obstacle locating apparatus according to an exemplary embodiment.

FIG. 8 is a block diagram of an obstacle locating apparatus according to an exemplary embodiment. For example, the apparatus 800 may be a mobile phone, a computer, a digital broadcast terminal, a messaging device, a gaming console, a tablet, a medical device, exercise equipment, a personal digital assistant or the like.

Referring to FIG. 8, the apparatus 80 may include one or more of the following components: a processing component 802, a memory 804, a power component 806, a multimedia component 808, an audio component 810, an input/output (I/O) interface 812, a sensor component 814 and a communication component 816.

The processing component 802 generally controls the overall operations of the apparatus 800, for example, display, phone call, data communication, camera operation and record operation. The processing component 802 may include one or more processors 818 to execute instructions to perform all or part of the steps in the above described methods. In addition, the processing component 802 may include one or more modules to facilitate the interaction between the processing component 802 and other components. For example, the processing component 802 may include a multimedia module to facilitate the interaction between the processing component 808 and the processing component 802.

The memory 804 may be configured to store various types of data to support the operation performed on the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power supply management system, one or more power sources, and any other components associated with the generation, management, and distribution of power in the apparatus 800.

The multimedia component 808 includes a screen providing an output interface between the apparatus 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive external multimedia data while the apparatus 800 is in an operation mode, such as a photographing mode or a video mode. Each of the front camera and the rear camera may be a fixed optical lens system or have focus and optical zoom capability.

The audio component 810 may be configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, a microwave sensor or a temperature sensor.

The communication component 816 may be configured to facilitate wired or wireless communication between the apparatus 800 and other devices. The apparatus 800 can access a wireless network based on a communication standard, such as WiFi, 2G, or 3G, or a combination thereof. In one exemplary embodiment, the communication component 816 receives a broadcast signal or broadcast related information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods executed by a mobile device for locating an obstacle.

In exemplary embodiments, there is also provided a non-transitory computer readable storage medium including instructions, such as included in the memory 804, executable by the processor 818 of the apparatus 800, for performing the above-described methods executed by a mobile device for locating an obstacle. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the appended claims.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An obstacle locating method implemented in a locating device, comprising:
    acquiring a location of the locating device when an obstacle is found;
    adding the location and an identification of an indoor map corresponding to the location into location information, wherein the identification identifies the indoor map stored in the locating device, the indoor map reflecting relative locations of fixed objects in an indoor space;
    sending the location information to a mobile device, wherein the location information triggers the mobile device to mark and display the location on the indoor map having the identification;
    photographing the obstacle to obtain a picture of the obstacle; and
    adding the picture of the obstacle into the location information, wherein, after the location information is sent to the mobile device, the picture in the location information triggers the mobile device to display the picture of the obstacle at the marked and displayed location on the indoor map having the identification carried in the location information.

2. The method according to claim 1, wherein acquiring the location of the locating device comprises:
reading the indoor map stored in the locating device; and
according to the indoor map, acquiring location coordinates of a current location of the locating device on the indoor map and setting the location coordinates as the location of the locating device; or according to the indoor map, acquiring a location region on the indoor map in which the locating device is located and setting the location region as the location of the locating device.

3. The method according to claim 2, further comprising:
receiving a marked location sent by the mobile device, wherein the locating device does not record a location of the obstacle when finding the obstacle in a preset region around the marked location.

4. The method according to claim 1, wherein adding the location and the identification of the indoor map corresponding to the location into the location information comprises:
if a recorded location is not within a preset range from a fixed object, adding the location and the identification of the indoor map into the location information, the fixed object being an object which cannot be moved indoors or which is moved at a frequency less than a preset frequency.

5. The method according to claim 4, further comprising:
receiving a marked location sent by the mobile device, wherein the locating device does not record a location of the obstacle when finding the obstacle in a preset region around the marked location.

6. The method according to claim 1, further comprising:
receiving a marked location sent by the mobile device, wherein the locating device does not record a location of the obstacle when finding the obstacle in a preset region around the marked location.

7. An obstacle locating apparatus implemented in a locating device, comprising:
a processor; and
a memory for storing instructions executable by the processor;
wherein the processor is configured to:
acquire a location of the locating device when an obstacle is found;
add the location and an identification of an indoor map corresponding to the location into location information, wherein the identification identifies the indoor map stored in the locating device, the indoor map reflecting relative locations of fixed objects in an indoor space;
send the location information to a mobile device, wherein the location information triggers the mobile device to mark and display the location on the indoor map having the identification;
photograph the obstacle to obtain a picture of the obstacle; and
add the picture of the obstacle into the location information, wherein, after the location information is sent to the mobile device, the picture in the location information triggers the mobile device to display the picture of the obstacle at the marked and displayed location on the indoor map having the identification carried in the location information.

8. The apparatus of claim 7, wherein the processor is further configured to:
read the indoor map stored in the locating device; and
according to the indoor map, acquire location coordinates of a current location of the locating device on the indoor map and set the location coordinates as the location of the locating device;
or according to the indoor map, acquire a location region on the indoor map in which the locating device is located and set the location region as the location of the locating device.

9. The apparatus of claim 8, wherein the processor is further configured to:
receive a marked location sent by the mobile device, wherein the locating device does not record a location of the obstacle when finding the obstacle in a preset region around the marked location.

10. The apparatus of claim 7, wherein the processor is further configured to:
if a recorded location is not within a preset range from a fixed object, add the location and the identification of the indoor map into the location information, the fixed object being an object which cannot be moved indoors or which is moved at a frequency less than a preset frequency.

11. The apparatus of claim 10, wherein the processor is further configured to:
receive a marked location sent by the mobile device, wherein the locating device does not record a location of the obstacle when finding the obstacle in a preset region around the marked location.

12. The apparatus of claim 7, wherein the processor is further configured to:
receive a marked location sent by the mobile device, wherein the locating device does not record a location of the obstacle when finding the obstacle in a preset region around the marked location.

* * * * *